(12) United States Patent
Jain et al.

(10) Patent No.: US 9,292,251 B2
(45) Date of Patent: *Mar. 22, 2016

(54) SYSTEMS AND METHODS FOR CONFIGURING MEDIA DEVICES UTILIZING AUDIO CODES OR SIGNATURES

(71) Applicant: The Nielsen Company (US), LLC, Schaumburg, IL (US)

(72) Inventors: Anand Jain, Ellicott City, MD (US); John Stavropoulos, Edison, NJ (US); Alan Neuhauser, Silver Spring, MD (US); Wendell Lynch, East Lansing, MI (US); Vladimir Kuznetsov, Ellicott City, MD (US); Jack Crystal, Owings Mills, MD (US); David Gish, Riverdale, NJ (US)

(73) Assignee: The Nielsen Company (US), LLC, New York, NY (US)

( * ) Notice: Subject to any disclaimer, the term of this patent is extended or adjusted under 35 U.S.C. 154(b) by 22 days.

This patent is subject to a terminal disclaimer.

(21) Appl. No.: 14/467,781

(22) Filed: Aug. 25, 2014

(65) Prior Publication Data

US 2014/0365689 A1    Dec. 11, 2014

Related U.S. Application Data

(63) Continuation of application No. 13/657,430, filed on Oct. 22, 2012, now Pat. No. 8,826,316.

(51) Int. Cl.
*H04N 21/233* (2011.01)
*G06F 3/16* (2006.01)
*H04N 21/439* (2011.01)
(Continued)

(52) U.S. Cl.
CPC .............. *G06F 3/165* (2013.01); *G06F 3/061* (2013.01); *G06F 3/067* (2013.01); *G06F 3/0659* (2013.01); *H04N 21/4394* (2013.01); *H04N 21/44222* (2013.01); *H04N 21/6543* (2013.01); *H04N 21/8166* (2013.01)

(58) Field of Classification Search
None
See application file for complete search history.

(56) References Cited

U.S. PATENT DOCUMENTS 5,440,632 A    8/1995  Bacon et al.
5,446,919 A    8/1995  Wilkins (Continued)

OTHER PUBLICATIONS

Fink, M., et al., "Social- and Interactive-Television Applications Based on Real-Time Ambient-Audio Identification", http://www.mangolassi.org/covell/pubs/euroITV-2006.pdf, date unknown, 10 pages.

(Continued)

*Primary Examiner* — Nasser Goodarzi
*Assistant Examiner* — Adil Ocak
(74) *Attorney, Agent, or Firm* — Hanley, Flight & Zimmerman, LLC

(57) ABSTRACT

Example systems and methods for configuring media devices utilizing audio codes and/or signatures are disclosed. Example methods disclosed herein include, responsive to determining that an audio code is not present in audio data received by a device, generating a signature from the audio data. Such example methods also include determining whether the signature is associated with a first command to be executed by the device to modify operation of the device. Such example methods further include, when the signature is determined to be associated with the first command, executing the first command to modify the operation of the device.

15 Claims, 7 Drawing Sheets

(51) Int. Cl.
*H04N 21/442* (2011.01)
*H04N 21/6543* (2011.01)
*H04N 21/81* (2011.01)
*G06F 3/06* (2006.01)

(56) References Cited

U.S. PATENT DOCUMENTS

| | | |
|---|---|---|
| 5,481,294 A | 1/1996 | Thomas et al. |
| 5,583,562 A | 12/1996 | Birch et al. |
| 5,666,293 A | 9/1997 | Metz et al. |
| 5,760,820 A | 6/1998 | Eda et al. |
| 5,978,037 A | 11/1999 | Hilpert et al. |
| 6,675,384 B1 | 1/2004 | Block et al. |
| 6,738,978 B1 | 5/2004 | Hendricks et al. |
| 8,508,357 B2 | 8/2013 | Srinivasan et al. |
| 2007/0143778 A1 | 6/2007 | Covell et al. |
| 2007/0271300 A1 | 11/2007 | Ramaswamy |
| 2007/0294705 A1 | 12/2007 | Gopalakrishnan et al. |
| 2008/0148307 A1 | 6/2008 | Nielsen et al. |
| 2009/0193052 A1 | 7/2009 | Fitzgerald et al. |
| 2009/0290852 A1 | 11/2009 | Wright |
| 2010/0280641 A1 | 11/2010 | Harkness et al. |
| 2014/0111698 A1 | 4/2014 | Jain et al. |

OTHER PUBLICATIONS

Claburn, T., "Google Researchers Propose TV Monitoring", Information Week, http://www.informationweek.com/news/internet/showArticle.jhtml?articleID=188702619, Jun. 7, 2006, 3 pages.

Anderson, N., "Google to compete with Nielsen for TV-ratings info?", http://arstechnica.com/old/content/2006/06/7081.ars, Jun. 19, 2006, 2 pages.

United States Patent and Trademark Office, "Non-Final Office Action", issued in connection with U.S. Appl. No. 13/657,430, dated Jul. 17, 2013 (14 pages).

United States Patent and Trademark Office, "Notice of Allowance", issued in connection with U.S. Appl. No. 13/657,430, dated May 1, 2014 (8 pages).

International Searching Authority, "International Preliminary Report on Patentability", issued in connection with International Patent Application No. PCT/US2013/054505, dated Apr. 28, 2015 (8 pages).

SYSTEMS AND METHODS FOR CONFIGURING MEDIA DEVICES UTILIZING AUDIO CODES OR SIGNATURES

RELATED APPLICATION(S)

This patent arises from a continuation of U.S. patent application Ser. No. 13/657,430 (now U.S. Pat. No. 8,826,316), entitled "Systems and Methods for Configuring Media Devices Utilizing Audio Codes or Signatures" and filed on Oct. 22, 2012. U.S. patent application Ser. No. 13/657,430 is hereby incorporated by reference in its entirety.

FIELD OF THE DISCLOSURE

The present disclosure is directed to processor-based audience analytics and media terminal device control. More specifically, the disclosure describes systems and methods for controlling the configuration and operation of terminal media devices, such as set-top boxes (STBs), using encoded audio and/or audio signatures.

BACKGROUND

There is considerable interest in monitoring and measuring the usage of media data accessed by an audience via radio, satellite, network, or other source. In order to determine audience interest and what audiences are being presented with, a user's system may be monitored for discrete time periods while connected to a network, such as the Internet. There is also considerable interest in providing market information to advertisers, media distributors and the like which reveal the demographic characteristics of such audiences, along with information concerning the size of the audience. Further, advertisers and media distributors would like the ability to produce custom reports tailored to reveal market information within specific parameters, such as type of media, user demographics, purchasing habits and so on. In addition, there is substantial interest in the ability to monitor media audiences on a continuous, real-time basis.

In addition to audience measurement, there has developed an increased interest in being able to remotely configure terminal devices, such as set-top boxes (STBs), to suit the needs of the measuring entity. As STBs become more sophisticated devices, users are able to use them much in the same way they use home computers, laptops, tablets and the like. The growing popularity of Internet Protocol television (IPTV) has created additional possibilities in home media consumption and media measurement. Briefly, IPTV is a system through which television and/or other services are delivered using the Internet protocol suite over a packet-switched network such as the Internet, instead of (or in addition to) being delivered through traditional terrestrial, satellite signal, and cable television formats. Typically, IPTV services include (a) live television, with or without interactivity related to the current TV show, (b) time-shifted television, i.e., replaying a TV show that was broadcast previously, and (c) video on demand (VOD) that allows access to a catalog of videos, not related to TV programming. Since a STB network connection is present, additional media such as streaming audio or radio, web pages may be received in the STB As well.

While current technology allows STBs to be configured at a customer premises, more recent technology allows STBs to be configured remotely to include software updates, new programming, or additional services. However, this current technology is performed almost exclusively through a data connection that is not scalable across different platforms, and makes it tedious for content providers to give users access to additional content and/or functionalities on their respective STBs. Accordingly, there is a need for new and/or additional techniques for configuring STBs and other media devices remotely. By opening media device configuration to other platforms, new functionalities may be enabled that give users flexibility in configuring their devices, while giving media measurement entities new formats for determining media consumption.

SUMMARY

For this application the following terms and definitions shall apply:

The term "data" as used herein means any indicia, signals, marks, symbols, domains, symbol sets, representations, and any other physical form or forms representing information, whether permanent or temporary, whether visible, audible, acoustic, electric, magnetic, electromagnetic or otherwise manifested. The term "data" as used to represent predetermined information in one physical form shall be deemed to encompass any and all representations of corresponding information in a different physical form or forms.

The terms "media data" and "media" as used herein mean data which is widely accessible, whether over-the-air, or via cable, satellite, network, internetwork (including the Internet), print, displayed, distributed on storage media, or by any other means or technique that is humanly perceptible, without regard to the form or content of such data, and including but not limited to audio, video, audio/video, text, images, animations, databases, broadcasts, displays (including but not limited to video displays, posters and billboards), signs, signals, web pages, print media and streaming media data.

The term "research data" as used herein means data comprising (1) data concerning usage of media data, (2) data concerning exposure to media data, and/or (3) market research data.

The term "ancillary code" as used herein means data encoded in, added to, combined with or embedded in media data to provide information identifying, describing and/or characterizing the media data, and/or other information useful as research data.

The terms "reading" and "read" as used herein mean a process or processes that serve to recover research data that has been added to, encoded in, combined with or embedded in, media data.

The term "database" as used herein means an organized body of related data, regardless of the manner in which the data or the organized body thereof is represented. For example, the organized body of related data may be in the form of one or more of a table, a map, a grid, a packet, a datagram, a frame, a file, an e-mail, a message, a document, a report, a list or in any other form.

The term "network" as used herein includes both networks and internetworks of all kinds, including the Internet, and is not limited to any particular network or inter-network.

The terms "first", "second", "primary" and "secondary" are used to distinguish one element, set, data, object, step, process, function, activity or thing from another, and are not used to designate relative position, or arrangement in time or relative importance, unless otherwise stated explicitly.

The terms "coupled", "coupled to", and "coupled with" as used herein each mean a relationship between or among two or more devices, apparatus, files, circuits, elements, functions, operations, processes, programs, media, components, networks, systems, subsystems, and/or means, constituting any one or more of (a) a connection, whether direct or through one or more other devices, apparatus, files, circuits, elements, functions, operations, processes, programs, media, components, networks, systems, subsystems, or means, (b) a communications relationship, whether direct or through one or more other devices, apparatus, files, circuits, elements, functions, operations, processes, programs, media, components, networks, systems, subsystems, or means, and/or (c) a functional relationship in which the operation of any one or more devices, apparatus, files, circuits, elements, functions, operations, processes, programs, media, components, networks, systems, subsystems, or means depends, in whole or in part, on the operation of any one or more others thereof.

The terms "communicate," and "communicating" and as used herein include both conveying data from a source to a destination, and delivering data to a communications medium, system, channel, network, device, wire, cable, fiber, circuit and/or link to be conveyed to a destination and the term "communication" as used herein means data so conveyed or delivered. The term "communications" as used herein includes one or more of a communications medium, system, channel, network, device, wire, cable, fiber, circuit and link.

The term "processor" as used herein means processing devices, apparatus, programs, circuits, components, systems and subsystems, whether implemented in hardware, tangibly-embodied software or both, and whether or not programmable. The term "processor" as used herein includes, but is not limited to one or more computers, hardwired circuits, signal modifying devices and systems, devices and machines for controlling systems, central processing units, programmable devices and systems, field programmable gate arrays, application specific integrated circuits, systems on a chip, systems comprised of discrete elements and/or circuits, state machines, virtual machines, data processors, processing facilities and combinations of any of the foregoing.

The terms "storage" and "data storage" as used herein mean one or more data storage devices, apparatus, programs, circuits, components, systems, subsystems, locations and storage media serving to retain data, whether on a temporary or permanent basis, and to provide such retained data.

Accordingly, apparatuses, systems and methods are disclosed for computer-implemented techniques for modifying operation of a media terminal device. Under one exemplary embodiment, audio is received in the media terminal device and processed to obtain a characteristic of the audio, wherein the characteristic comprises at least one of (i) ancillary code embedded in the audio, and (ii) an audio signature extracted from the audio. Next it is determined if the characteristic corresponds to a predetermined characteristic, wherein the predetermined characteristic is linked to a command. If the characteristic is determined to correspond to the predetermined characteristic, the command is executed, wherein the executed command modifies an operational parameter of the media terminal device.

Under another exemplary embodiment, data is received from a media terminal device, wherein the data comprises a characteristic of audio received in the media terminal device, the characteristic comprising at least one of (i) ancillary code decoded from the audio and (ii) an audio signature extracted from audio. The data is processed to determine if the characteristic corresponds to a predetermined characteristic, wherein the predetermined characteristic is linked to a command. If the characteristic is determined to correspond to the predetermined characteristic, the command is transmitted to the media terminal device and configured to modify an operational parameter of the media terminal device.

Under another exemplary embodiment, a media terminal device is disclosed comprising an input for receiving audio; a processing apparatus coupled to the input for processing a characteristic of the audio, wherein the characteristic comprises at least one of (i) ancillary code embedded in the audio, and (ii) an audio signature extracted from the audio; wherein the processing apparatus is configured to determine if the characteristic corresponds to a predetermined characteristic, wherein the predetermined characteristic is linked to a command; and wherein the processing apparatus is configured to execute the command if the characteristic is determined to correspond to the predetermined characteristic, wherein the executed command modifies an operational parameter of the media terminal device.

BRIEF DESCRIPTION OF THE DRAWINGS

The present invention is illustrated by way of example and not limitation in the figures of the accompanying drawings, in which like references indicate similar elements and in which.

DETAILED DESCRIPTION

Various embodiments of the present invention will be described herein below with reference to the accompanying drawings. In the following description, well-known functions or constructions are not described in detail since they would obscure the invention in unnecessary detail. Under an exemplary embodiment, a system is implemented in a Set Top Box (STB) that may be configured to gather research data using encoding technology (e.g., CBET) concerning exposure of a user of the STB to audio and/or visual media. One example of such a device is described in U.S. patent application Ser. No. 12/724,070, titled "Set-Top-Box with Integrated Encoder/Decoder for Audience Measurement" filed Mar. 15, 2010, assigned to the assignee of the present application and is incorporated by reference in its entirety herein. Generally speaking, a STB in the present disclosure relates to any consumer electronic devices capable to receive media/video content including digital video broadcast (DVB) standards and present the content to a user. In the case of video content, the development of IP networks and broadband/ADSL allow video content of good quality to be delivered as Internet Protocol television (IPTV) in the set-top boxes. Digital television may be delivered under a variety of DVB (Digital Video Broadcast) standards, such as DVB, DVB-S, DVB-S2, DVB-C, DVB-T and DVB-T2. The STBs may accept content from terrestrial, satellite, cable and/or streaming media via IP network. Other types of media content may include static or interactive content, such as web pages.

An exemplary STB comprises a frontend which includes a tuner and a DVB demodulator. The frontend receives a raw signal from antenna or cable, and the signal is converted by the frontend into transport (MPEG) stream. Satellite equipment control (SEC) may also be provided in the case of satellite antenna setup. Additionally, a conditional access (CA) module or smartcard slot is provided to perform real-time decoding of encrypted transport stream. Demuxer filters incoming DVB stream and splits a transport stream into video and audio parts. The transport stream can contain some special streams like teletext or subtitles. Video and audio streams are preferably separated.

Figure 1:
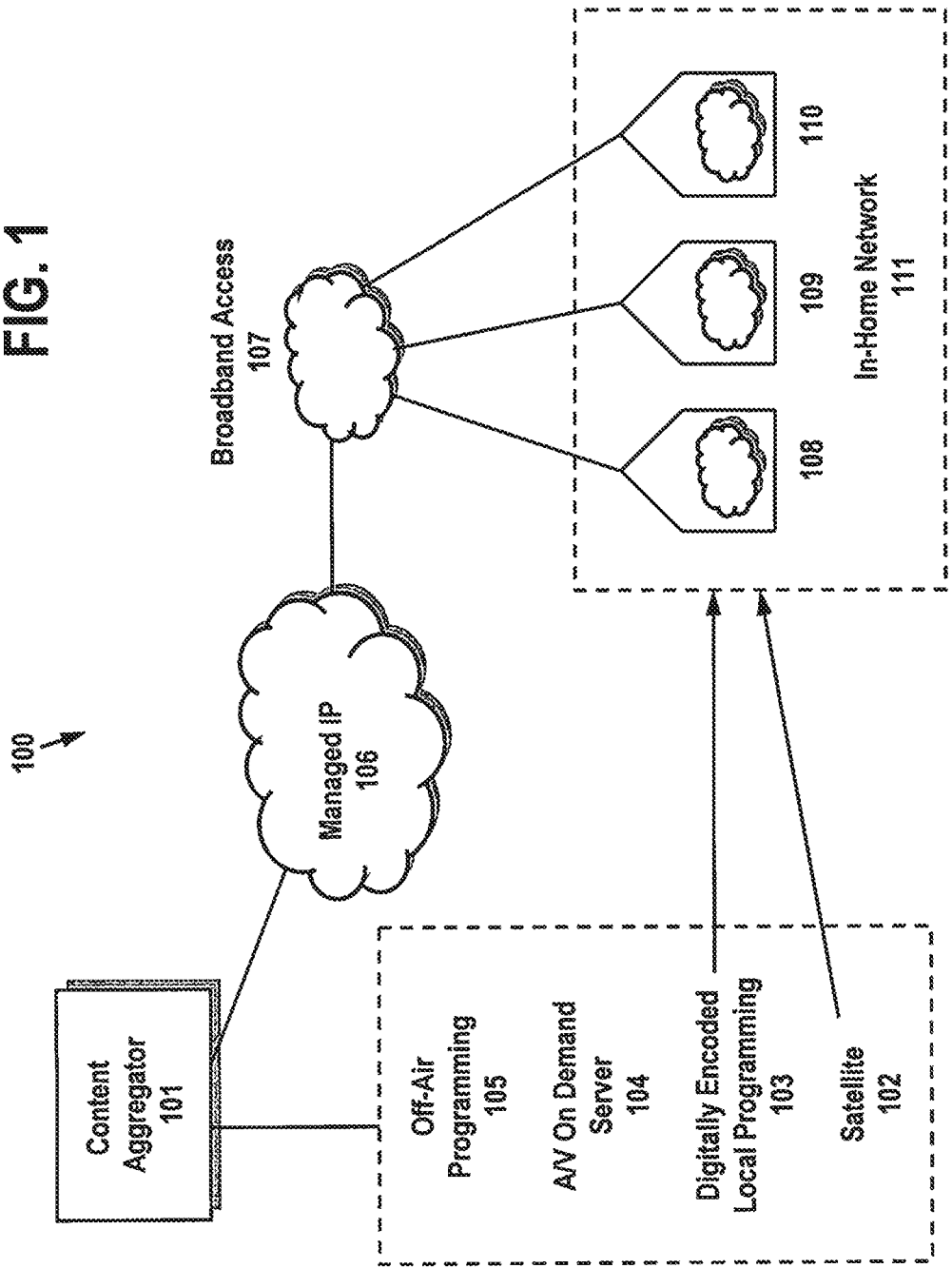
FIG. 1 illustrates an exemplary media network system under one embodiment.

Turning to FIG. 1, an exemplary system 100 is disclosed illustrating an end-to-end view of a media delivery network, where content may be delivered in a variety of formats including satellite 102, digitally encoded local programming 102, A/V on-demand server 104, and off-air programming 105. In one embodiment, this content is provided to a content aggregator 101 that is responsible for distributing the content to a managed IP network 106, which in turn is connected to a broadband access network 107. From here, the content is provided to individual (preferably networked) households 108-110 in an in-home network 111. In an alternate embodiment, certain content, such as satellite 102 and digitally encoded local programming 103 may be conventionally broadcast over-the-air via satellite, coaxial cable and the like. The system network 100 of FIG. 1 may be thought of as being similar to the public Internet, except that it is a managed network. Content is delivered to STBs in home network 111 similar to the way a streaming video is sent to a PC. However, because the network is managed, including the access portion of the network, video QoE may be maintained at a broadcast level, rather than a "best-effort" basis like the public Internet. Content may be delivered under the HomePNA standard via coaxial cable or telephone line.

Figure 2:
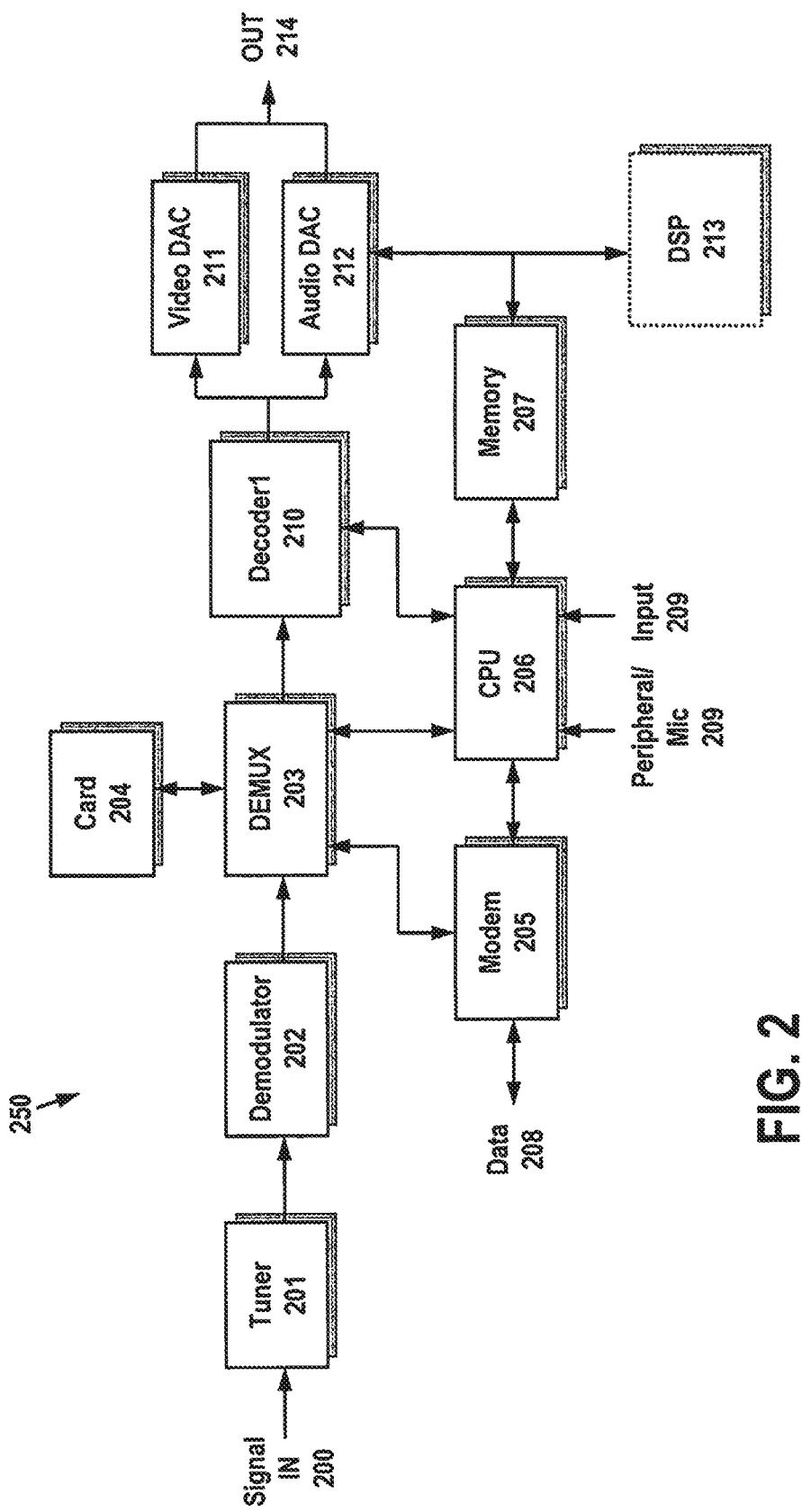
FIG. 2 is an exemplary functional block diagram of a terminal media device under one embodiment.

Turning to the exemplary embodiment in FIG. 2, a more detailed illustration of a STB 250 is shown. Here, a CPU 206 controls and/or communicates directly/indirectly with demultiplexer 203, decoder 210, modem 205, card reader 204, memory 207, video digital-to-analog converter (DAC) 211, audio DAC 212 and digital signal processing (DSP) circuitry 213. While tuner 201 receives media from source signal 200, modem 205 accepts interactive or other data 208 received from a computer-based network. Card reader 204 accepts smart cards and/or cable cards for identifying a user and for allowing the user to further interact with the set-top box, either alone, or in conjunction with user inputs 209, which may be a keyboard, infrared device, track ball, etc. A peripheral audio capture device or microphone 209 is configured to capture ambient or direct audio in STB 250.

In one exemplary embodiment, a source signal is received 200, and tuner 201 down-converts the incoming carrier to an intermediate frequency (IF). The IF signal is demodulated into in-phase ("I") and quadrature phase ("Q") carrier components which are then A-D converted into a plurality of multi-bit data streams (e.g., 6-bit) for digital demodulation 202 and subsequent processing such as forward-error correction (FEC) in which the Reed-Solomon check/correction, de-interleaving and Viterbi decoding are carried out. A resulting transport stream is then forwarded to demultiplexer 203 which has responsibility for transmitting signals to respective video and audio (MPEG) decoders (210).

Decoder 210 is responsible for composing a continuous moving picture from the received frames from demultiplexer 203. Additionally, decoder 210 performs necessary data expansion, inverse DCT, interpolation and error correction. The reconstituted frames may be built up inside the decoder's DRAM (not show), or may also use memory 207. Decoder 210 outputs a pulse train containing the necessary A/V data (e.g., Y, Cr and Cb values for the pixels in the picture), which is communicated to video DAC 211 for conversion (and possible PAL encoding, if necessary).

In addition, decoder 210 forwards audio DAC 424 for conversion and for presenting the audio (L-R) and/or video to media device 214. Additionally, DSP 213 may process audio from decoder 210 to read codes and/or extract audio signatures that may be subsequently stored in memory 207. In certain embodiments, DSP 213 may comprise a chip, circuitry or a device coupled with STB 250 such as a peripheral device, or a board, such as a soundboard. In certain embodiments, the board may be plugged into an expansion slot of the STB. In certain embodiments, DSP 213 is programmable such that it is provided with decoding and/or signature extracting software prior to coupling with the user system or after coupling with the user system. In these embodiments, the decoding software is loaded from a storage device or from the audio source or another source, or via another communication system or medium.

In one embodiment, DSP 213 comprises a decoder serving to decode ancillary data embedded in audio signals in order to detect codes that may be used to configure STB 250 as well as signify exposure to media. Examples of techniques for encoding and decoding such ancillary data are disclosed in U.S. Pat. No. 6,871,180, titled "Decoding of Information in Audio Signals," issued Mar. 22, 2005, and is incorporated by reference in its entirety herein. Other suitable techniques for encoding/decoding data in audio are disclosed in U.S. Pat. No. 7,640,141 to Ronald S. Kolessar and U.S. Pat. No. 5,764,763 to James M. Jensen, et al., which are incorporated by reference in their entirety herein. Other appropriate encoding techniques are disclosed in U.S. Pat. No. 5,579,124 to Aijala, et al., U.S. Pat. Nos. 5,574,962, 5,581,800 and 5,787,334 to Fardeau, et al., and U.S. Pat. No. 5,450,490 to Jensen, et al., each of which is assigned to the assignee of the present application and all of which are incorporated herein by reference in their entirety.

An audio signal which may be encoded with a plurality of code symbols is received via microphone or via a direct link through audio circuitry 209. The received audio signal may be from streaming media, broadcast, otherwise communicated signal, or a signal reproduced from storage in a device. It may be a direct coupled or an acoustically coupled signal. From the following description in connection with the accompanying drawings, it will be appreciated that the decoder is capable of detecting codes in addition to those arranged in the formats disclosed hereinabove.

Alternately or in addition, DSP 213 can processes the frequency-domain audio data to extract a signature therefrom, i.e., data expressing information inherent to an audio signal, for use in configuring STB 250 as well as identifying the audio signal or obtaining other information concerning the audio signal (such as a source or distribution path thereof). Suitable techniques for extracting signatures include those disclosed in U.S. Pat. No. 5,612,729 to Ellis, et al. and in U.S. Pat. No. 4,739,398 to Thomas, et al., both of which are incorporated herein by reference in their entireties. Still other suitable techniques are the subject of U.S. Pat. No. 2,662,168 to Scherbatskoy, U.S. Pat. No. 3,919,479 to Moon, et al., U.S. Pat. No. 4,697,209 to Kiewit, et al., U.S. Pat. No. 4,677,466 to Lert, et al., U.S. Pat. No. 5,512,933 to Wheatley, et al., U.S. Pat. No. 4,955,070 to Welsh, et al., U.S. Pat. No. 4,918,730 to Schulze, U.S. Pat. No. 4,843,562 to Kenyon, et al., U.S. Pat. No. 4,450,551 to Kenyon, et al., U.S. Pat. No. 4,230,990 to Lert, et al., U.S. Pat. No. 5,594,934 to Lu, et al., European Published Patent Application EP 0887958 to Bichsel, PCT Publication WO02/11123 to Wang, et al. and PCT publication WO91/11062 to Young, et al., all of which are incorporated herein by reference in their entireties. As discussed above, the code detection and/or signature extraction serve to configure STB 250 and/or identify and determine media exposure for the user of STB 250.

Figure 3:
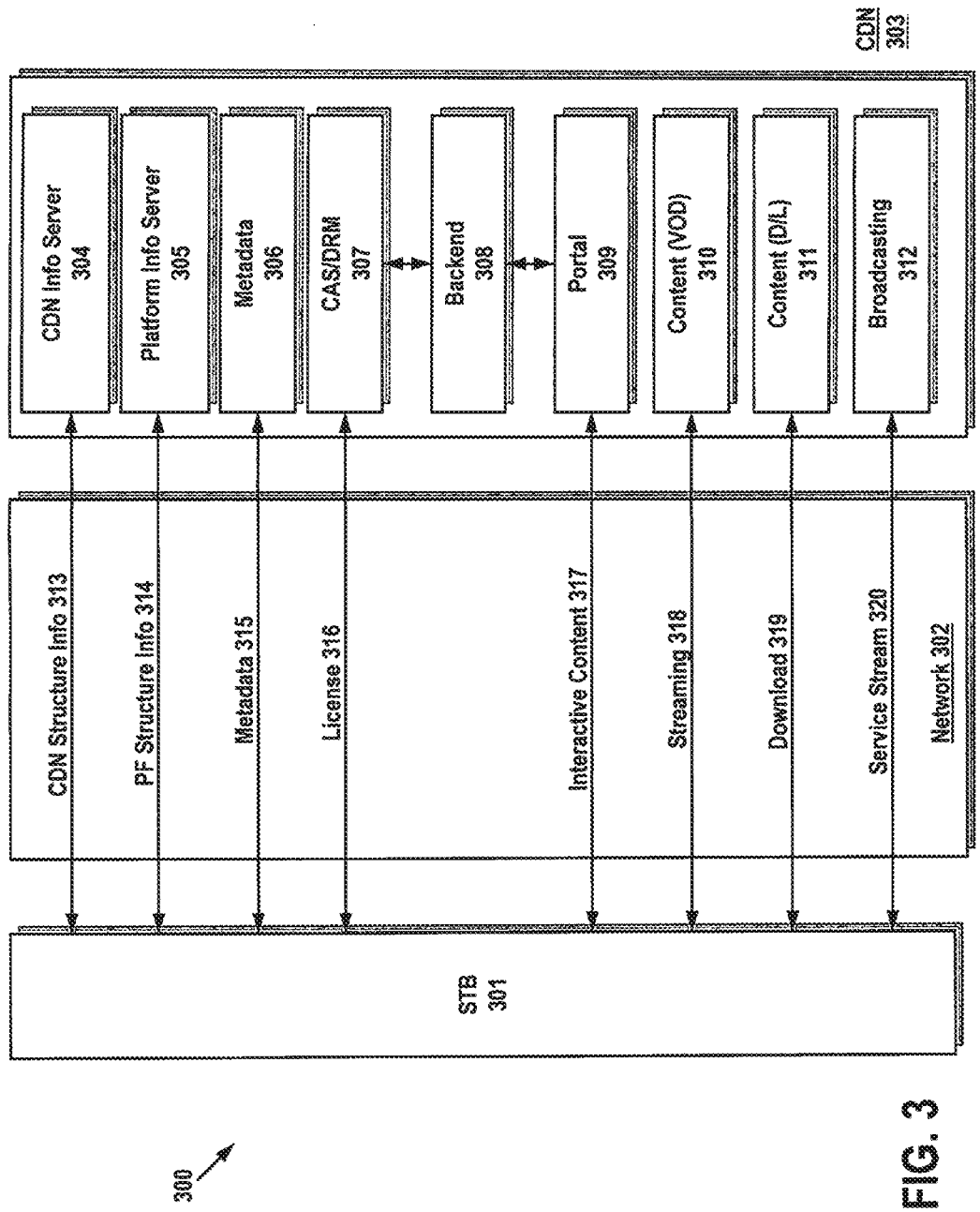
FIG. 3 illustrates a an exemplary distribution network for distributing media content to a user premises.

Turning to FIG. 3, an exemplary system 300 is shown illustrating configuration data and content delivery from content delivery network (CDN) 303 to STB 301 via access network 302. In this embodiment, CDN 303 comprises a CDN information portion 304 for communicating CDN structure information 313 to STB 301, and a platform information (PF) portion 305 for communicating platform structure information 314 to STB 301 via access network 302. This information may provide parameter data of CDN and PF configuration data, respectively. A key purpose of this data is to supply entry data to each service. CDN structure information 313 may define the fixed data for the CDN, and the fixed data for each platform provider configured on the CDN. PF structure information 314 may define the fixed data for the platform provider, and the fixed data for each service provider configured on the platform. When a STB initially connects to system 300, it preferably obtains CDN structure information and PF structure information to enable it to receive the services of all the platform providers and service providers included on the CDN of the access point. This information may be used to establish content format and transmission format including data encoding (e.g., video encoding (AVC, MPEG-2), audio encoding (AAC-LC, MPEG-1-L2), etc.), streaming transmission and reception, broadcast service channel selection, video-on-demand (VOD) streaming service content, browser and multimedia encoding, authentication, and other functions.

Metadata portion 306 is configured to deliver metadata 315 necessary for functions such as selecting channels of a broadcast service, and display electronic program guides (EPGs) and/or electronic content guides (ECGs). STB 301 is preferably configured to obtain and update necessary metadata either by multicast or unicast. A conditional access system (CAS) and digital rights management (DRM) portion 307 may be configured to issue and manage licenses 316, and may deliver licenses by establishing a secure communication channel between the STB 301 and CAS/DRM 307. Under a preferred embodiment, STB 301 accesses CAS/DRM 307 to obtain a license when it is time to play content. Portal 309 is preferably configured to provide web services and interactive content 317 as a means for promotion and content navigation. Portal 309 may also be utilized various kinds of registration screens and authentication processes, by linking with customer and contract management functions, where STB 301 may access portal 309 as a subscriber. Portal 309 and CAS/DRM 307 may be communicatively coupled to a backend 308 for processing and managing data.

VOD content 310 delivers video to supply VOD streaming services 318. Preferably, VOD 310 not only delivers the content itself via streaming, but also provides the playback control files for each item of content (to be obtained before streaming) and functions such as real-time streaming protocol (RTSP) sequences for streaming control. Typically, STB 301 must access this portion to receive VOD streaming services. Content (D/L) 311 may also deliver video via download, in order to supply content download services. Broadcast service transmission portion 312 delivers video in order to supply broadcast services. Generally, video signals are relayed from the broadcast facilities of external content providers, and transmitted by multicast. STB 301 should access these multicast addresses whenever it selects a broadcast service channel.

System 300 may be configured to accommodate distribution networks and home networks, where a distribution network delivers various kinds of information such as content, metadata, and licenses, connected with functional entities for supplying services. A home network refers to networks existing within households, which can be connected with PCs and other devices that may not necessarily be utilized in the delivery of services. Under this embodiment, a home gateway may be connected between the STB 301 and a network provider's public network. The functions of the STB may then be divided between the STB and gateway and may also include a separate user-to-network interface through the incorporation of a gateway. The connections between the STB and home network(s) may take place using the IPv4, IPv6, or IPv4+IPv6 protocols.

Figure 4A:
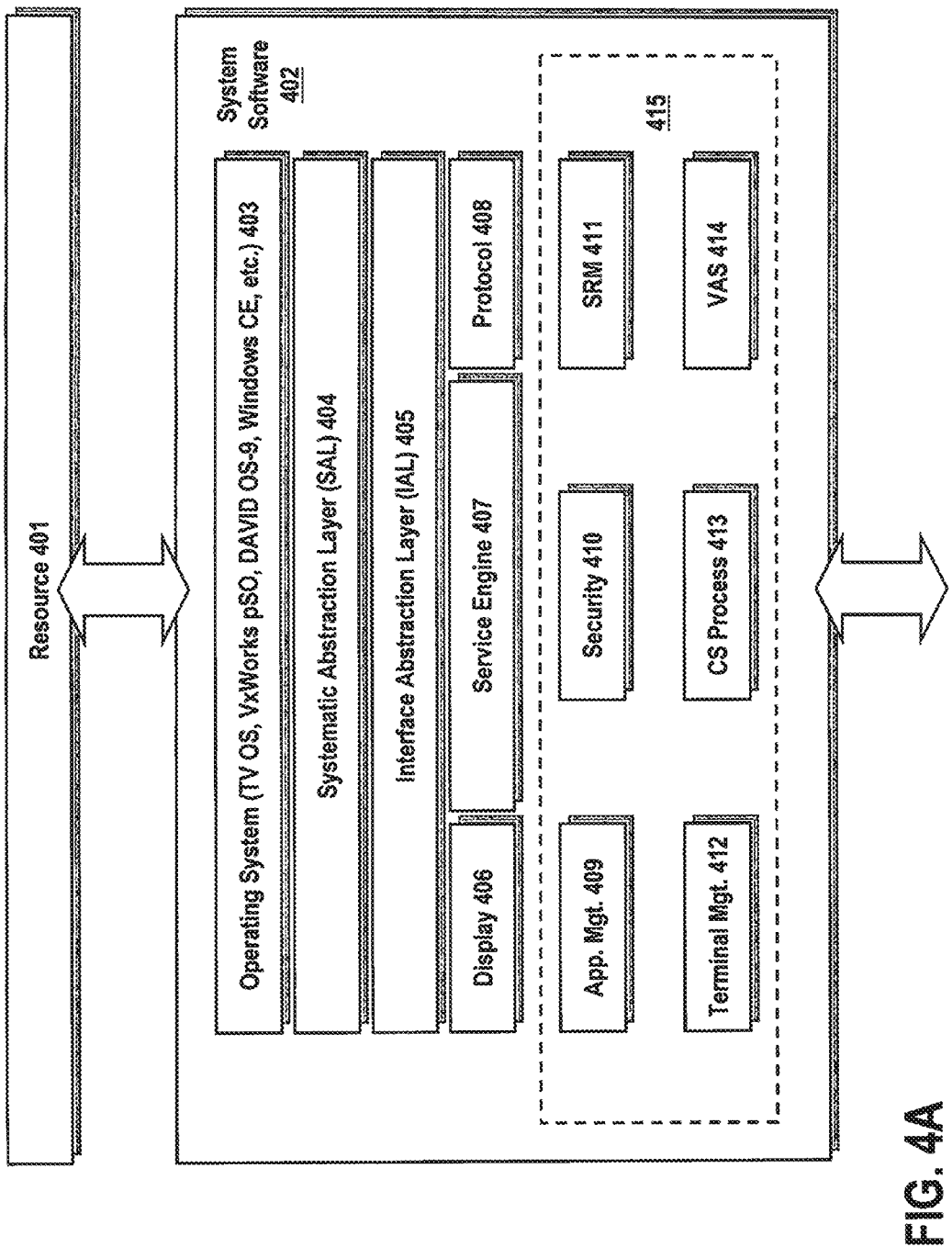
FIG. 4A illustrates exemplary software architecture layers for a terminal device under one embodiment.

Turning to FIG. 4A, an exemplary STB software architecture layer diagram is illustrated. Generally speaking, the software architecture comprises a resource layer 401, a system software layer 402, a middleware application programming interface (API) layer 416, an application layer 417 and a service layer 418, and may be developed using a variety of known programming languages including C, C++, JAVA, and so on. Resource layer 401 is considered the lowest layer and preferably comprises hardware and software resources (hardware drivers, boot loader, lib API, etc.), and may include a resource abstract layer (RAL) to provide an abstract view of the hardware/software resources to the software and middleware service components for easier integration. Resource layer 401 communicates with system software 402 comprising an operating system 403 and transplantable layers comprising system abstraction layer 404 and interface abstraction layer 405 that allow resources to be transparently provided and to access all local resources as if they were are a single entity. This generally provides an interface between the hardware devices and system software and shields the upper application layers from the physical hardware devices.

Software layer 402 may also include a display module 406, service engine 407 and protocol module 408 (for access protocols, streaming protocols, transmit protocols, management protocols, etc.) to provide basic software and networking functions and to interact with middleware core modules 415 for managing STB operation. As can be seen from FIG. 4A, middleware core modules 415 may include application management module 409 (e.g., DRM application, plug-in application, browser application, media player application, GUI application, etc.), security module 410, system resource management module 411, STB management module 412, content service process module 413 and value-added services 414 (e.g., games, shopping applications, etc.). Together, these modules operate to perform functions such as startup and initialization, security and authentication, stream rendering and control, commands and events, system resource control (e.g., file system management, maintaining real-time clock), hardware resource control (e.g., hard disk, memory, interface, etc.), network and transport protocol management, CAS/DRM and software download and upgrade, among others. Accordingly, software layer 402 may serve to call operating system resources and lower layer hardware resource, while also providing various services for upper application layers such as media play and control, media stream transmission control, user authentication, download services, etc.

Figure 4B:
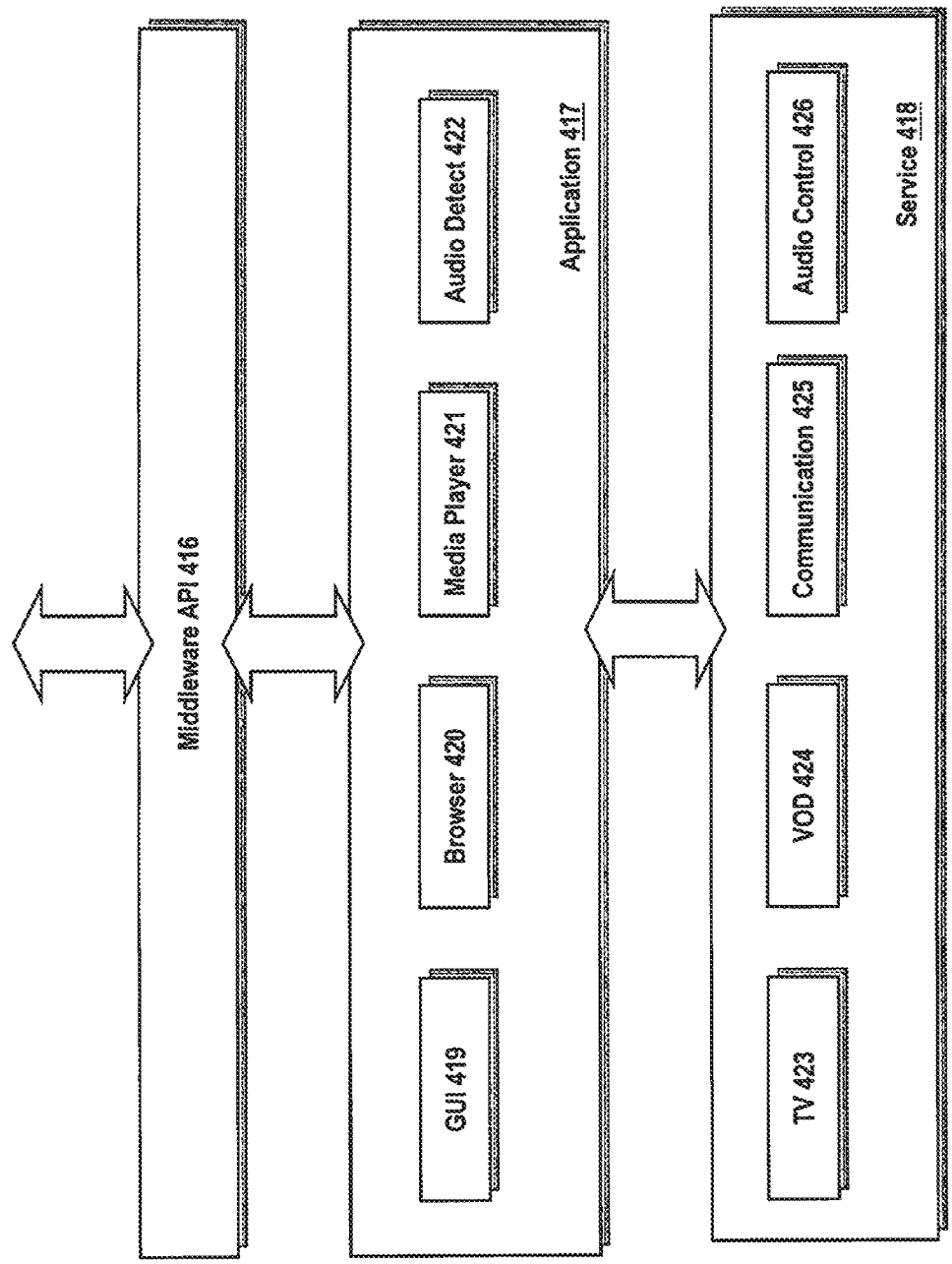
FIG. 4B illustrates additional software architecture layers from FIG. 4A.

Software layer 402 may communicate through middleware API 416 to application layer 417, although use of middleware API 416 is optional. Nevertheless, middleware API 416 may be advantageous in that the layer may readily be used to improve path management and decrease application complexity, provide simplified APIs for application development and provide open interfaces to integrate user applications with third party vendors. Application layer 417 generally comprises various applications that are either downloaded or resident in nature. Generally speaking, an application is an application that is executable and may be powered by a presentation engine (e.g. HTML Browser, Flash). In FIG. 4B, exemplary application layer 417 comprises a graphic user interface (GUI) 419, a browser 420, media player 421 and audio detect 422. In one embodiment, audio detect module 422 operates to read ancillary audio code and/or extract audio signatures as discussed above. Once a specific code is read and/or signature is extracted, audio detect module 422 communicates with the other layers to perform a specific function and/or modify the operation of a STB. Additional details regarding this feature will be discussed in greater detail below.

Application layer 417 communicates with service layer 418, which may be considered the highest layer of the architecture shown in FIGS. 4A-B. Service layer 418 calls the element supported by application layer 417 to fulfill STB-related services, which may include television 423, VOD 424 and network communication 425. Additionally, service layer may include an audio command module 426 that communicates data to network 302 based on code and/or signature data received from audio detect module 422. The data communicated from audio command module 426 may be used to modify operation or services of a STB, or enable STB to receive new services or capabilities provided by a media network.

Figure 5:
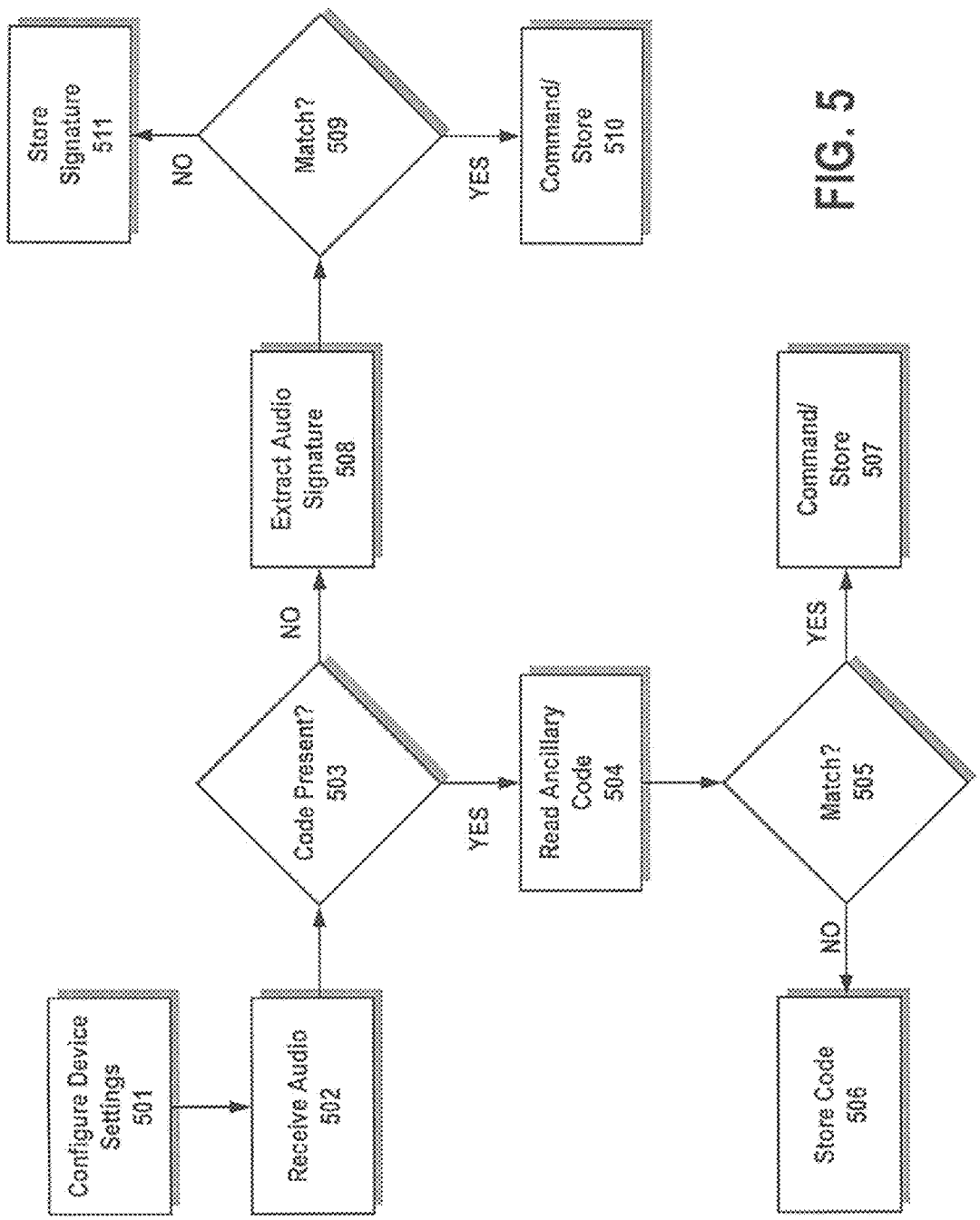
FIG. 5 illustrates a flow diagram for configuring a terminal device utilizing audio under one embodiment.

One exemplary process for configuring a STB or other terminal device is described in the embodiment of FIG. 5. In step 501, a device is initialized before operation and is loaded with predetermined settings that are applicable to the device. The settings may include channel settings, applications, security, and so on. As incoming media is received in the terminal device 502, the audio is processed to determine the presence of ancillary audio code 503. If code is detected, it is processed in 505 to see if the code matches a predetermined code residing in storage. Under one exemplary embodiment, predetermined codes are downloaded and stored on the terminal device itself. When ancillary codes are read, they are compared to the predetermined codes via a look-up table or other suitable means, to see if there is a match. If no match exists, the code is simply stored in 506 as research data and may subsequently be used for determining media exposure. However, if a match does exist, the terminal device activates a command 507 and may additionally store the code 507 as research data for subsequent media exposure monitoring. The command activated in 507 may be an internal command or a command that is transmitted to a network. In one advantageous embodiment, the command is formed from audio code obtained from the application layer and service layer audio detection (422) and control (426). The resulting command is generated in the terminal device and transmitted to a network, where it is forwarded to any CDN provider, service provider, platform provider, or any other entity responsible for controlling or providing services for the terminal device.

If, in step 503, no ancillary code is detected, the terminal device may extract an audio signature 508 from the audio. The audio signature may be formed using the frequency domain, the time domain, or a combination of both. The extracted signature is then compared to a signature database or look-up table to determine if the signature correlates to the stored signature 509. If there is no match, the signature is simply stored 511 and may be used as research data for subsequent media exposure monitoring. If there is a match, the terminal device activates a command 510 and may additionally store the signature as research data for subsequent media exposure monitoring. Similar to audio code, the command activated in 510 may be an internal command or a command that is transmitted to a network. In one advantageous embodiment, the command is formed from audio code obtained from the application layer and service layer audio detection (422) and control (426). The resulting command is generated in the terminal device and transmitted to a network, where it is forwarded to any CDN provider, service provider, platform provider, or any other entity responsible for controlling or providing services for the terminal device.

Figure 6:
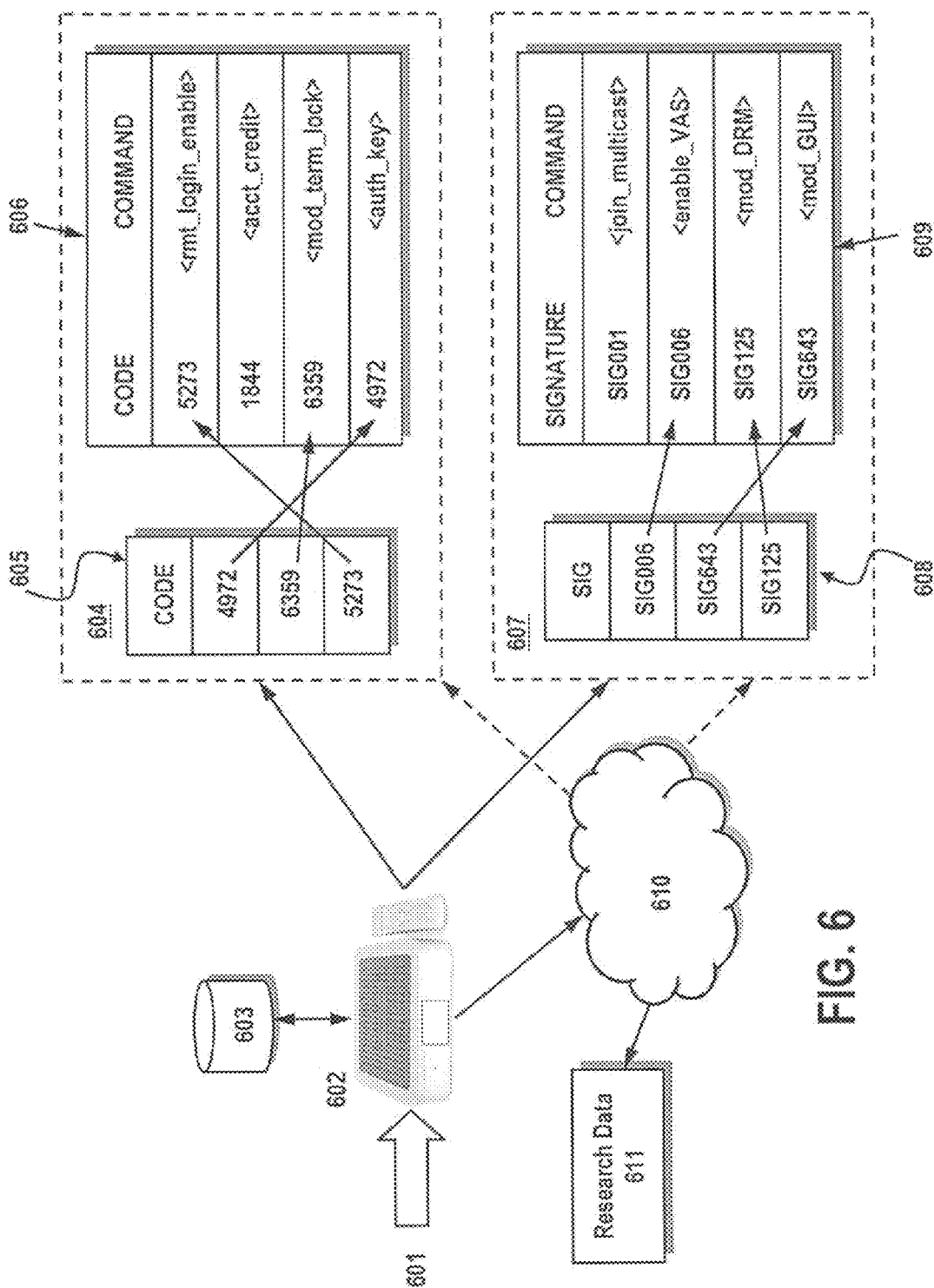
FIG. 6 illustrates an embodiment for executing commands to configure a terminal device using audio codes and/or audio signatures.

Turning to FIG. 6, another exemplary embodiment is disclosed where a terminal device (e.g., STB) 602 receives incoming media or audio 601. Terminal device 602 may include storage 603 for storing data, media or other information and storage 603 may be integrated into terminal device 602. As incoming audio is processed to detect codes and/or extract signatures, the codes/signatures are preferably transmitted through network 610 to be further processed as research data 611. In one embodiment, audio code command databases 606 are stored in terminal device 602. Database 606 comprises codes along with correlated commands that may be executed upon the detection of a respective code. These codes are preferably inserted into audio at the time of broadcasting or transmission, and are carried with the audio utilizing masking techniques to make them substantially imperceptible. These codes may also be inserted into the audio at the time of creation, which is advantageous in cases where the media is stored on a readable medium (e.g., DVD, media file, etc.). The codes may be in an alpha-numeric format or any other suitable format that allows the code to be uniquely identified from other codes.

In the example of FIG. 6, code "5273" of database 606 represents a terminal device command <rmt_login_enable> that modifies communications to allow the terminal device to accept remote log-ins from other devices. Code "1844" represents a command <acct_credit> that activates a credit on the terminal device (e.g., pay-per-view, VOD). Code "6359" represents command <mod_term_lock> that modifies permissions to allow/restrict terminal device access to locked features. Code "4972" represents a command for storing and/or transmitting authentication keys for services and features. One skilled in the art would understand that these examples are only a small portion of the various code-command combinations that are possible under the present disclosure. Other information, such as addressing data may be provided in database 606 to route commands to a specific entity that may be part of the CDN. For example an authentication key may be addressed for a specific server operated by a provider, or may alternately contain multiple addresses in cases where keys are shared.

As code is detected from audio, it is stored in 604. During an exemplary matching process each code in 604 is compared to database 606 to see if there is a match. Here, code "4972" is matched in database 606 to generate command <auth_key> in a service or application layer to provide or request an authentication key for the terminal device. Similarly, detected code "6359" is matched in database 606 resulting in a <mod_term_lock> command that unlocks services or features of the terminal device, and matching of code "5273" in database 606 activates <rmt_login_enable> to allow remote devices to log into the terminal device. In one embodiment, the code matching of 604 takes place entirely in terminal device 602. In another embodiment, audio codes detected in terminal device 602 are transmitted to network 610, and the matching process 604 is performed in the network or cloud. This embodiment is particularly advantageous when large volumes of audio codes and associated commands are used. In yet another embodiment, a first match 604 is first performed on the terminal device based on a smaller database 606. Subsequently, all the detected codes, which may include additional codes that were not matched on the terminal device, are transmitted to network 610 where a second match is performed based on a larger database. The results of the first and second match are then combined to get commands for reconfiguring the operation of the terminal device.

In addition to ancillary codes, a similar process may be accomplished using signature matching in 607. A signature-command database 609 may be stored in terminal device 602, where audio signatures represent respective commands. In the example of FIG. 6, audio signature SIG001 represents a <join_multicast> command to connect the terminal device to an IP multicast (e.g., UDP, PGM) to allow delivery of content or data (e.g., software upgrade). SIG006 represents an <enable_VAS> command to enable VAS for the set-top box, such as gaming, social networking, etc. SIG125 represents a <mod_DRM> command that modifies or creates a new DRM profile for accessing data or services. SIG643 represents a <mod_GUI> command for altering the graphics user interface to provide new or different screen buttons, "skins" and the like. Again, one skilled in the art would understand that these examples are only a small portion of the various signature-command combinations that are possible under the present disclosure, and that these commands may be combined with code commands 606 described above. Other information, such as addressing data may also be provided in database 609 to route commands to a specific entity that may be part of the CDN. In one embodiment, the signature matching of 607 takes place entirely in terminal device 602. In another embodiment, signatures extracted in terminal device 602 are transmitted to network 610, and the matching process 604 is performed in the network or cloud. This embodiment is particularly advantageous when large volumes of audio signatures and associated commands are used. In yet another embodiment, a first match (607) is first performed on the terminal device based on a smaller database (609). Subsequently, all the detected signatures, which may include additional signatures that were not matched, are transmitted to network 610 where a second match is performed based on a larger database. The results of the first and second match are then combined to get commands for reconfiguring the operation of the terminal device. Also, signatures may be combined with other signatures as well as other codes to provide additional commands.

It should be noted that the audio codes and signatures for reconfiguring terminal devices do not have to originate from a broadcaster or CDN provider. Terminal devices, such as STBs, may be equipped with microphones (209) to capture ambient audio. As STBs may be set in an "always on" condition, the microphone may be used to capture audio codes and/or signatures to generate configuration commands. In one embodiment, a cell phone may contain an encoded audio file. When this audio file is played, the STB microphone picks up the audio and uses the ancillary code to generate commands. Thus, the phone may be used to remotely activate or control features in the terminal device. In another embodiment, audio signatures may be extracted from the audio of other devices involving different platforms (e.g., radio). The extracted signatures may be used to provide accesses to services, software or data in the STB.

While some of the exemplary embodiments provided above were discussed in the context of STBs, one skilled in the art would understand that the configurations could be adapted to other terminal devices as well, which may include personal computers, computer peripherals, network appliances, mobile devices and specialized service termination devices such as VoIP terminals or audio-visual equipment such as an MP3 player. While at least one example embodiment has been presented in the foregoing detailed description, it should be appreciated that a vast number of variations exist. It should also be appreciated that the example embodiment or embodiments described herein are not intended to limit the scope, applicability, or configuration of the invention in any way. Rather, the foregoing detailed description will provide those skilled in the art with a convenient and edifying road map for implementing the described embodiment or embodiments. It should be understood that various changes can be made in the function and arrangement of elements without departing from the scope of the invention and the legal equivalents thereof.

What is claimed is:

1. A method comprising:
responsive to determining, with a processor, that an audio code is not present in audio data received by a device, generating a signature from the audio data;
determining, with the processor, whether the signature is associated with a first command to be executed by the device to modify operation of the device;
when the signature is determined to be associated with the first command, executing the first command to cause the device to connect to a communication session to receive an upgrade to software executable on the device;
when the signature is determined to not be associated with the first command, determining, with the processor, whether the signature is associated with a second command; and
when the signature is determined to be associated with the second command, executing the second command to cause a previously locked feature of the device to be unlocked.

2. The method as defined by claim 1, further including:
when the signature is determined to not be associated with the first command or the second command, determining whether the signature is associated with a third command; and
when the signature is determined to be associated with the third command, executing the third command to cause the device to accept a remote login from another device.

3. The method as defined by claim 1, wherein the communication session is a multicast session.

4. The method as defined in claim 1, wherein the device is a first device, and when the signature is determined to not be associated with the first command or the second command, the method further includes:
sending the signature to a second device via a network, the second device to determine whether the signature is associated with a third command to be executed by the first device to modify the operation of the first device; and
when the signature is determined to be associated with the third command, executing the third command to modify the operation of the first device.

5. The method as defined by claim 1, further including accessing a table correlating commands with signatures to determine whether the signature is associated with the first command.

6. The method as defined by claim 5, wherein the table is stored at the device.

7. A computer readable storage device or storage disk comprising computer readable instructions which, when executed, cause a processor to at least:

generate a signature from received audio data responsive to determining that an audio code is not present in the received audio data;

determine whether the signature is associated with a first command to be executed to modify operation of a device;

when the signature is determined to be associated with the first command, execute the first command to cause the device to connect to a communication session to receive an upgrade to software executable on the device;

when the signature is determined to not be associated with the first command, determine whether the signature is associated with a second command; and when the signature is determined to be associated with the second command, execute the second command to cause a previously locked feature of the device to be unlocked.

8. The storage device or storage disk as defined in claim 7, wherein the computer readable instructions, when executed, further cause the processor to:

when the signature is determined to not be associated with the first command or the second command, determine whether the signature is associated with a third command; and when the signature is determined to be associated with the third command, execute the third command to cause the device to accept a remote login from another device.

9. The storage device or storage disk as defined in claim 7, wherein the communication session is a multicast session.

10. The storage device or storage disk as defined in claim 7, wherein the device is a first device, and when the signature is determined to not be associated with the first command or the second command, the computer readable instructions, when executed, further cause the processor to:

send the signature to a second device via a network, the second device to determine whether the signature is associated with a third command to be executed by the first device to modify the operation of the first device; and when the signature is determined to be associated with the third command, execute the third command to modify the operation of the first device.

11. The storage device or storage disk as defined in claim 7, wherein the computer readable instructions, when executed, further cause the processor to access a table correlating commands with signatures to determine whether the signature is associated with the first command.

12. A device comprising:
a processor to:
generate a signature from received audio data responsive to determining that an audio code is not present in the received audio data;

determine whether the signature is associated with a first command to be executed to modify operation of the device;

when the signature is determined to be associated with the first command, execute the first command to cause the device to connect to a communication session to receive an upgrade to software executable on the device;

when the signature is determined to not be associated with the first command, determine whether the signature is associated with a second command; and when the signature is determined to be associated with the second command, execute the second command to cause a previously locked feature of the device to be unlocked; and a memory to store a table correlating commands with signatures, the processor to access the table to determine whether the signature is associated with at least one of the first command or the second command.

13. The device as defined in claim 12, wherein the processor is further to:

when the signature is determined to not be associated with the first command or the second command, determine whether the signature is associated with a third command; and when the signature is determined to be associated with the third command, execute the third command to cause the device to accept a remote login from another device.

14. The device as defined in claim 12, wherein the communication session is a multicast session.

15. The device as defined in claim 12, wherein the device is a first device, and when the signature is determined to not be associated with the first command or the second command, the processor is further to:

send the signature to a second device via a network, the second device to determine whether the signature is associated with a third command to be executed by the first device to modify the operation of the first device; and when the signature is determined to be associated with the third command, execute the third command to modify the operation of the first device.

* * * * *